US012257757B2

(12) United States Patent
Banaei et al.

(10) Patent No.: US 12,257,757 B2
(45) Date of Patent: Mar. 25, 2025

(54) STRUCTURED PREFORMS FOR THERMAL DRAWING

(71) Applicant: EVERIX INC., Orlando, FL (US)

(72) Inventors: Esmaeil Banaei, Orlando, FL (US); Justin Boga, Orlando, FL (US)

(73) Assignee: EVERIX INC., Orlando, FL (US)

( * ) Notice: Subject to any disclaimer, the term of this patent is extended or adjusted under 35 U.S.C. 154(b) by 0 days.

(21) Appl. No.: 17/611,479

(22) PCT Filed: May 15, 2020

(86) PCT No.: PCT/US2020/033195
§ 371 (c)(1),
(2) Date: Nov. 15, 2021

(87) PCT Pub. No.: WO2020/232376
PCT Pub. Date: Nov. 19, 2020

(65) Prior Publication Data
US 2022/0242025 A1 Aug. 4, 2022

Related U.S. Application Data

(60) Provisional application No. 63/024,892, filed on May 14, 2020, provisional application No. 62/848,243, filed on May 15, 2019.

(51) Int. Cl.
B32B 41/00 (2006.01)
B29C 48/00 (2019.01)
(Continued)

(52) U.S. Cl.
CPC ...... B29C 48/0021 (2019.02); B29C 48/0022 (2019.02); B29C 48/08 (2019.02); B29C 48/266 (2019.02); B29C 48/305 (2019.02); B29C 48/49 (2019.02); B29C 48/92 (2019.02); B32B 37/04 (2013.01); B32B 38/1841 (2013.01);
(Continued)

(58) Field of Classification Search
CPC . B29C 48/0021; B29C 48/0022; B29C 48/08; B29C 48/266; B29C 48/305; B29C 48/49; B29C 48/92; B29C 2948/92076; B29C 2948/92438; B29C 2948/92571; B29C 2948/92933; B29C 48/155; B29C 2793/0027; B29C 2948/92857; B29C 2948/92904; B29C 64/147; B29C 48/28; B29C 64/118; B32B 37/04;
(Continued)

(56) References Cited

U.S. PATENT DOCUMENTS 6,113,374 A * 9/2000 Brackman ............. B29C 48/832
425/73
2013/0193611 A1* 8/2013 Polk, Jr. ................ B29C 39/10
264/259

(Continued)

Primary Examiner — Michael N Orlando
Assistant Examiner — Joshel Rivera
(74) Attorney, Agent, or Firm — A. Robert Weaver; The Brickell IP Group, PLLC

(57) ABSTRACT

A device may generate a multi-layer stack of sheets that may be adhered into a slab-shaped preform for thermal drawing. The sheets may include sublayers. Stacking the sub-layered sheets results in accumulation of layers in the final fabricated preform. The stacking process may use mechanical translation and conveyance to support placement of the sheets and fabrication of the stack.

15 Claims, 12 Drawing Sheets

(51) Int. Cl.
  *B29C 48/08*    (2019.01)
  *B29C 48/25*    (2019.01)
  *B29C 48/305*   (2019.01)
  *B29C 48/49*    (2019.01)
  *B29C 48/92*    (2019.01)
  *B32B 37/04*    (2006.01)
  *B32B 38/18*    (2006.01)
  *B29L 31/34*    (2006.01)

(52) U.S. Cl.
  CPC .......... *B29C 2948/92076* (2019.02); *B29C 2948/92438* (2019.02); *B29C 2948/92571* (2019.02); *B29C 2948/92933* (2019.02); *B29L 2031/3475* (2013.01); *B32B 2457/20* (2013.01)

(58) Field of Classification Search
  CPC .......... B32B 38/1841; B32B 2457/20; B29L 2031/3475; B33Y 10/00
  USPC .......... 156/60, 64, 350, 351, 378, 379
  See application file for complete search history.

(56) References Cited

U.S. PATENT DOCUMENTS

2014/0339722 A1* 11/2014 Yen .......... B29C 48/21
                                      264/45.9
2016/0082641 A1*  3/2016 Bogucki .......... B33Y 10/00
                                      118/302
2019/0039709 A1*  2/2019 Crites .......... B32B 9/041

\* cited by examiner

STRUCTURED PREFORMS FOR THERMAL DRAWING

PRIORITY

This application claims priority to U.S. Provisional Patent Application No. 62/848,243, filed May 15, 2019, which is incorporated herein in its entirety. This application also claims priority to U.S. Provisional Patent Application No. 63/024,892, filed May 14, 2020, which is incorporated herein in its entirety.

TECHNICAL FIELD

This disclosure relates to structured preforms for thermal drawing.

BACKGROUND

Rapid advances in display technologies, energy-efficiency, and various other optical devices, driven by immense customer demand, have resulted in the widespread use of optical media. As one example, many millions of square meters of optical filters are needed in flat and flexible screen displays throughout the world. Improvements in optical media quality and production speed will continue to increase demand.

DETAILED DESCRIPTION

Figure 1:
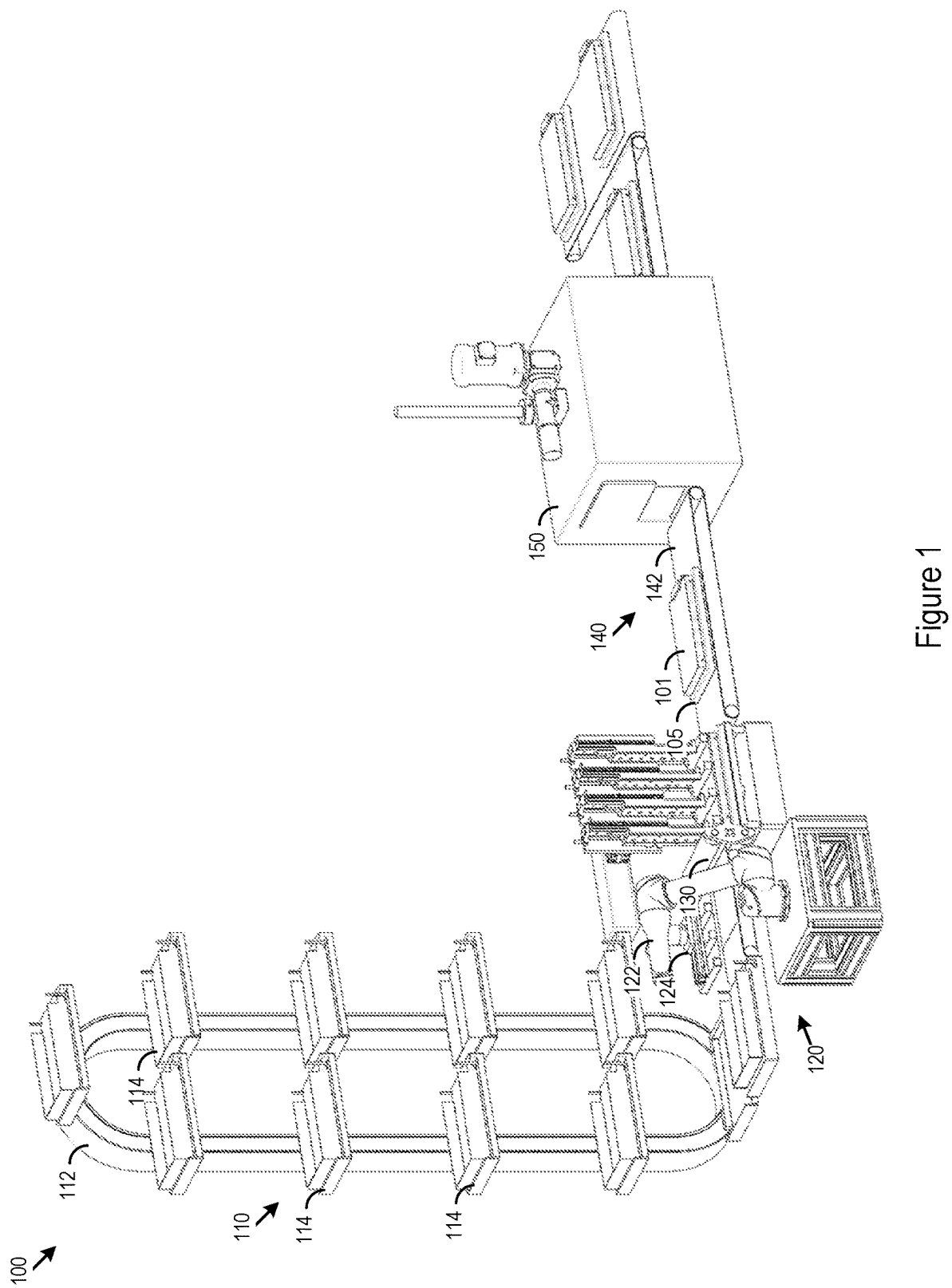
FIG. 1 shows an example device for preform fabrication.

In various systems for co-extrusion for the fabrication of multi-layer optical films, the finite friction on the material flow from the internal walls of co-extrusion feed-block and layer multiplier units in a co-extrusion line results in layer distortions that may affect the integrity and consistency of thin-film layers. This may, in some cases, affect the optical performance of the final fabricated optical component. Systems using self-assembled polymers and polymer-stabilized chiral liquid crystals may be used. However, self-assembly may present challenges in fabricating systems with numbers of layers in the tens, hundreds and/or thousands. Various modifications to the above techniques may be implemented to achieve: diversity of structure layer, up to tens/hundreds/thousands of layers or more, and high levels of optical quality upon fabrication. For example, as discussed below, co-extrusion, stack and draw, and/or other techniques may be used to generate first-stage slab like preforms that are then thermally drawn to generate a final fabricated optical component.

In various systems, slab-like preforms can be drawn down to intermediate-size films or sheets in a first drawing stage. These sheets can be stacked into the form of a multi-layer second-stage slab-like preform for drawing into a layered nano- or micro-scale sheet. For instance, the structured film (after multi-stage drawing) can be a multi-layer stack of 100 quarter-wave layers of two alternating materials (50 bi-layers) with different refractive indices. In an illustrative example, a thick preform with two layers with total thickness 25 mm can first be assembled such that the ratio of the two layers may be inversely proportional to the ratio of the refractive indices of the two materials. The two-layer preform can be assembled from materials that are thermally and chemically compatible so that they bind together under heat and pressure (just above the softening and/or melting points of the materials) or other adhesion methods. This example two-layer preform can subsequently be drawn by a factor of 250 into two-sublayer films of 0.1 mm thickness. Fifty such two-sublayer films with the same thickness can then be stacked on the top of each other under heat and pressure to create a 100-layer second-stage preform with a total multi-layer thickness of 5 mm. These multilayers can be embedded in jacket layers similar to photonic crystal fiber (PCF) canes that are often embedded in an outer tube. This second-stage preform can subsequently be drawn by a factor of 500 such that each internal bi-layer now becomes 200 nm, corresponding to a quarter-wave Bragg reflector in the infrared range of spectrum (wavelength depending on the refractive indices of the layers). This technique can be extended beyond the above illustrative example in various ways. For example, the technique may use first-stage films with more than two layers or more than two materials. In an example, the technique may be used to produce filters with layer thickness ratios other than those for use as quarter-wave stacks, for example, long period gratings, half-wave, full-wave, or sub-wavelength meta materials may be formed.

Additionally or alternatively, first-stage films (e.g., those forming the sublayers within films forming the preform stack) can be produced with techniques other than drawing. As an illustrative example, few-layer first-stage films can be produced through a co-extrusion process. As an example, co-extrusion feed blocks and dies with up to 12 sub-layers of up to four different materials (e.g., from four different feed-line-connected inputs) may be used. The die may support adjustment of the thickness of each individual die slit such that each of the multiple sublayer with the film (that is then stacked to construct the preform) can be independently customized. In some cases, a ratio of three may be achievable between a minimum and maximum sublayer thickness. The co-extruded films or sheets can then be assembled into second-stage preforms for thermal drawing of many-layer preforms.

Various techniques and architectures providing and producing such structured preforms for subsequent thermal drawing into structured films or sheets are described.

In various implementations, a stack assembly device can be utilized to assemble multi-layer preforms for subsequent thermal drawing.

At a first stage, various sheets, with different thicknesses, materials, sublayer configurations, or other characteristic may be stored in a sheet reservoir. The sheets may be of uniform length and width (even those of non-uniform thickness), such that that may be assembled into a stack that is flush on its sides. In some cases, a plane on a robotic arm or sheet sleeve on an assembly platform may be used push the sheets flush to one another. In some cases, the sheet sleeve may be removable form the assembly platform, such that it can be removed before the sheets are pressed to achieve adherence. The sheets may be brought forth by a pick-and-place robotic arm with suction lift grips (or other stacking system such as multiple parallel conveyor tracks with a transversely traveling collection platform). The sheets may be then put through a sheet cleaning system with dust pickup roller assemblies, ionized pressure air cleaning, or other cleaning systems. However, the need for cleaning after pick-and-place ordering may be dependent on dust and/or moisture levels within the sheet reservoir. Accordingly, in some cases, cleaning of the sheets may be absent from the system or skipped when measured conditions are met (e.g., air quality conditions, ambient dust levels, or other conditions).

At a second stage, the sheets may be assembled into the preform. The pick-and-place robotic arm (or a second post-cleaning stacking system) may place the sheets that were selected and ordered at the first stage on to a preform assembly platform. In an illustrative example, a series of suction arms that are organized vertically or horizontally in a line such that they hold and move the first edge of the cleaned sheet as it emerges from the cleaning segment. The last of the arms may align the sheet in the correct position on the preform assembly platform (or the incomplete preform that is under assembly) in the two horizontal directions (e.g., length and width). In some cases, the preform platform may include a vertical translation stage to bring top surface of an under-assembly preform to a selected height for the pick-and-place system to place the next sheet.

In this illustrative example, two arms (in some cases, separate and/or parallel) may be used. In the illustrative example, the top arm includes a soft cleaning roller, and the bottom arm includes a vacuum suction bar. The two arms then move horizontally along the length of the sheet. This process cleans the top surface while providing downward vertical press on the sheet to remove trapped air. The vacuum bar further aids in the dust/air removal process. In this illustrative example, the pick-and-place system may move arms or other obstructions out of the way for the two arms to allow uninterrupted travel across the stack by the two arms.

Once the preform stack assembled, a third pick-and-place system (e.g., a robotic arm, a conveyor system, or other pick-and-place system) may transfer the preform into a vacuum chamber that is equipped with top and bottom heated plates. The heated plates may sandwich the preform stack and apply controlled pressure under vacuum.

Figure 2:
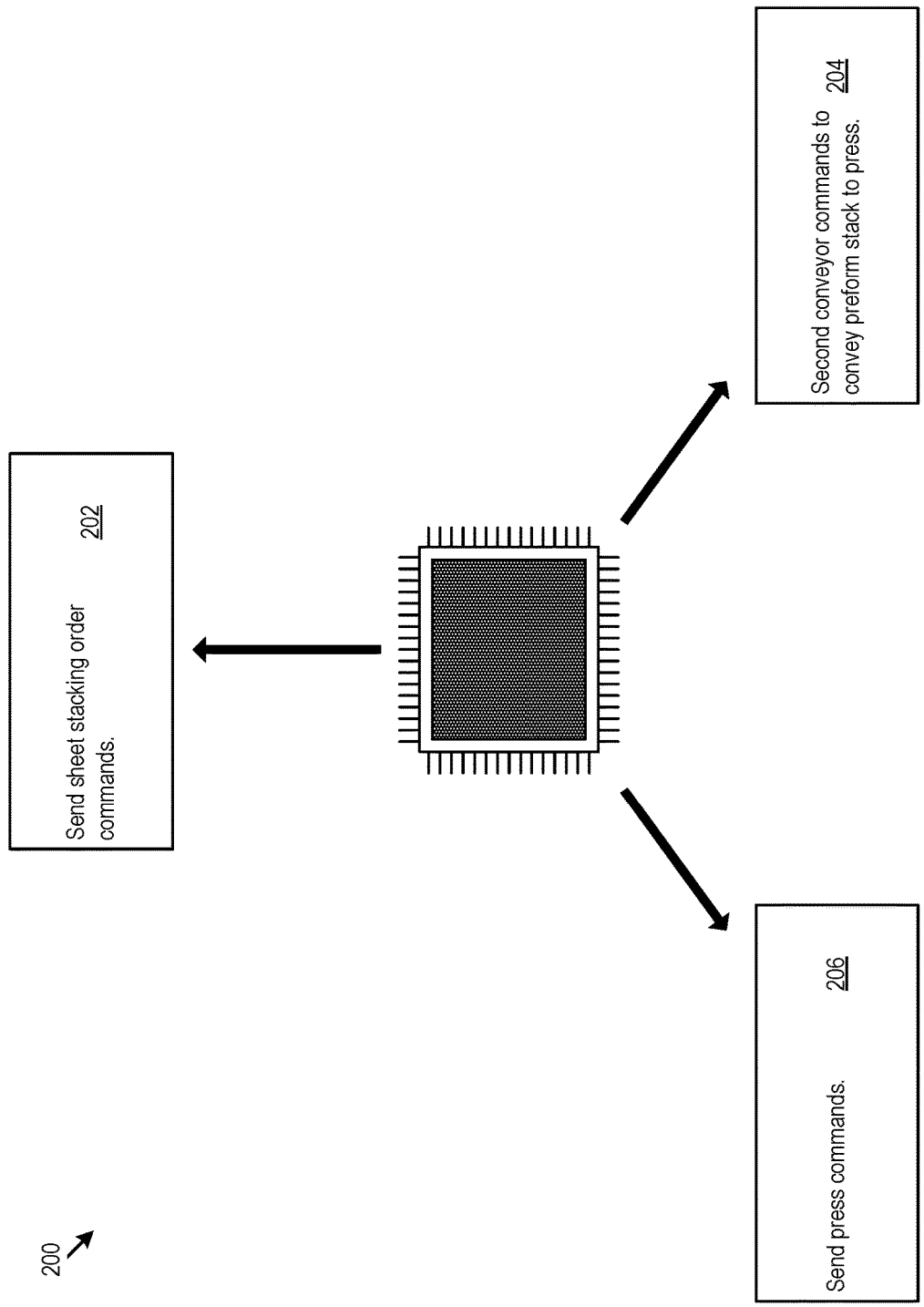
FIG. 2 corresponding logic for the operation of the preform fabrication device of FIG. 1.

Referring now to FIG. 1, an example device 100 for preform fabrication is shown. The device 100 includes a preform assembly platform 105, a sheet reservoir 110, a pick-and-place system 120, a cleaning system 130, a conveyor 140, and a press 150. Referring also to FIG. 2, corresponding logic 200 for the operation of the preform fabrication device is shown. The logic 200 may be implemented on controller circuitry.

Figure 3:
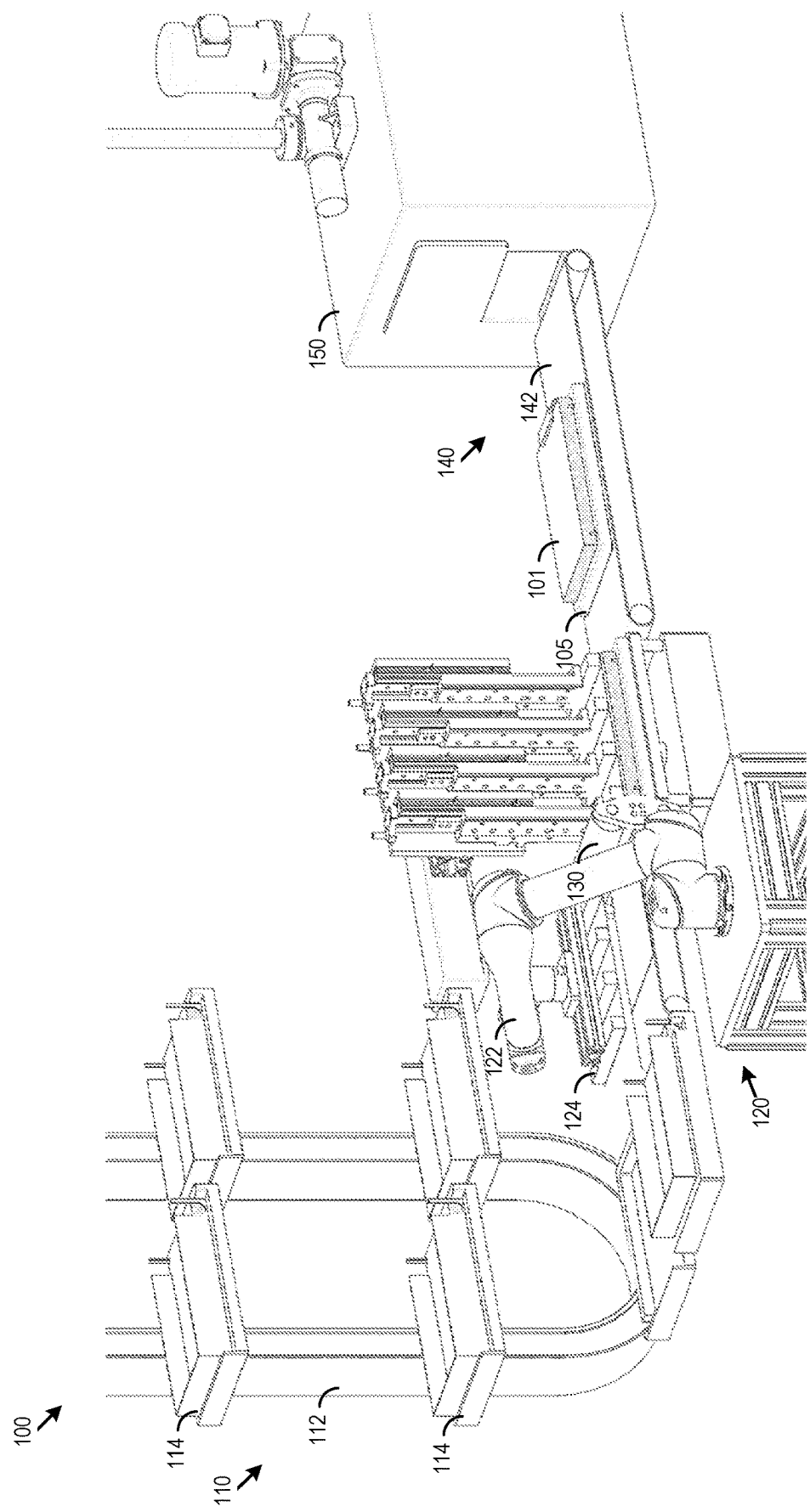
FIG. 3 shows another view of the device of FIG. 1.

For additional illustration, FIG. 3 is also referred to, which shows another view of the device 100.

The sheet reservoir 110 may include a carousel 112 with multiple bins 114 of sheets (e.g., as shown in the example device 100 of FIG. 1. In various implementations, the sheet reservoir may be implemented through various sheet storage and provision systems. For example, the sheet reservoir 110 may include multiple bins 114 with each with a different type of sheet. In some cases, the bins may be ordered in an array. For example, the array may have defined positions for particular sheet types. Thus, a pick-and-place system could correlate bin position with sheet type. Thus, a particular stacking order (e.g., the order in which sheets are placed in a preform stack) could be implemented by taking sheets from in order from particular positions in the array.

In some implementations, the sheet reservoir may include a bin with sheets in a pre-arranged stacking order. For example, the sheets may be loaded into the bin of the sheet reservoir in the order (or reverse order) in which the sheets may be placed in the preform stack. Stacking orders may include repeating patterns, alternating patterns, mathematically progressing patterns (e.g., diffraction grating patterns), randomized/pseudorandomized patterns or other patterns for optical devices.

In some implementations, the reservoir may include an input conveyor belt on which the sheets are stacked. In some cases, the sheets may arrive on the conveyor belt in the stacking order.

In some implementations, a carousel may be used. In some cases, the carousel may be vertical or horizontal. In some cases, multiple parallel carousels may be used (e.g., with a transversely traveling pick-and-place system that travels among the carousels to collect various sheets in the stacking order.

In some cases, multiple conveyor tracks may be used, for example with different sheet types on different tracks. A transversely traveling pick-and-place system may be used to collect the sheets from the different tracks in the stacking order.

The example pick-and-place system 120, which may include a robotic arm 122 with a sheet grip 124 disposed on the distal end of the robotic arm 122, may receive commands sent from the logic 200 to stack the sheets from the sheet reservoir 110 on the preform assembly platform 105 in the stacking order (202). In various systems, the sheet grip may include a suction cup system, a clamp, a static cling system or other system for gripping sheets. At the time of assembly of the preform stack 101, the cleaning system 130 may be co-located with the preform assembly platform 105. In some cases, the preform assembly platform 105 may be located at an output of the cleaning system 130. In some cases, the preform assembly platform 105 may include a tray that may be conveyed by belt and/or picked up by a robotic arm to allow the stack to be transported as a unit before the sheets are adhered to one another. In some cases, the pick-and-place system may include a movable plane for pressing the side of the sheet stack flush to ensure that the sheets are properly aligned.

Figure 4:
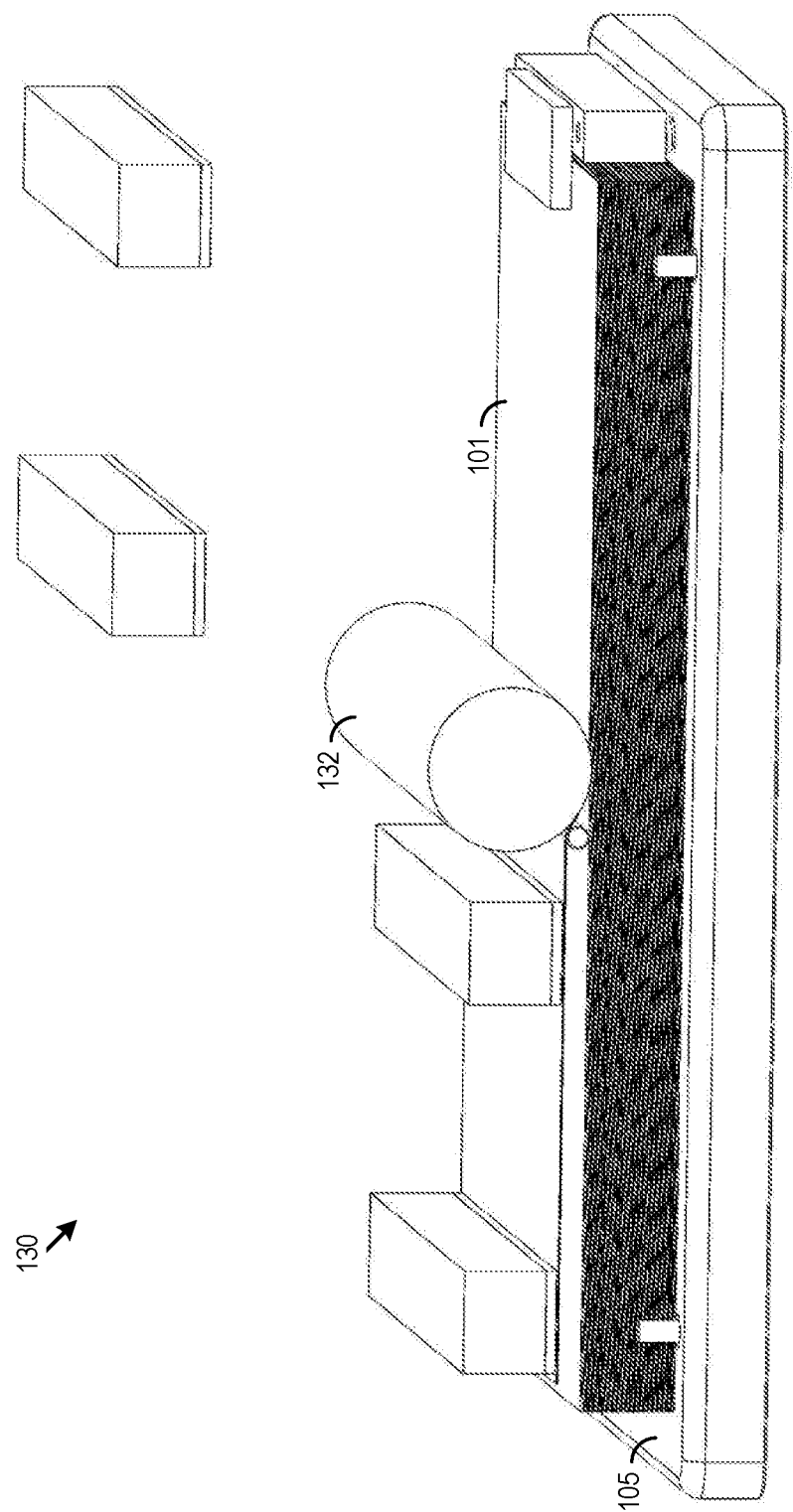
FIG. 4 shows a close up view of the top roller arm.
Figure 5:
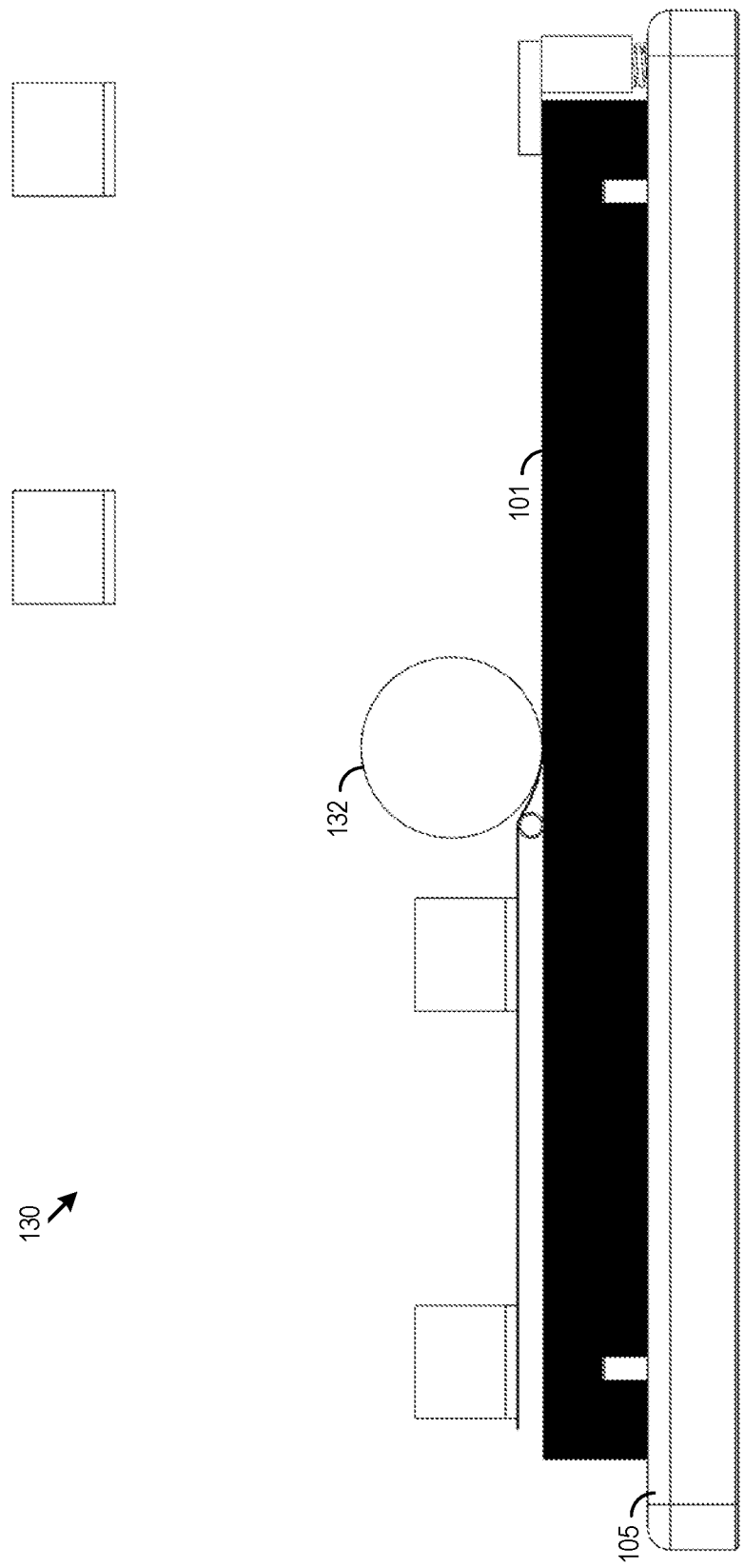
FIG. 5 shows another close up view of the top roller arm.
Figure 6:
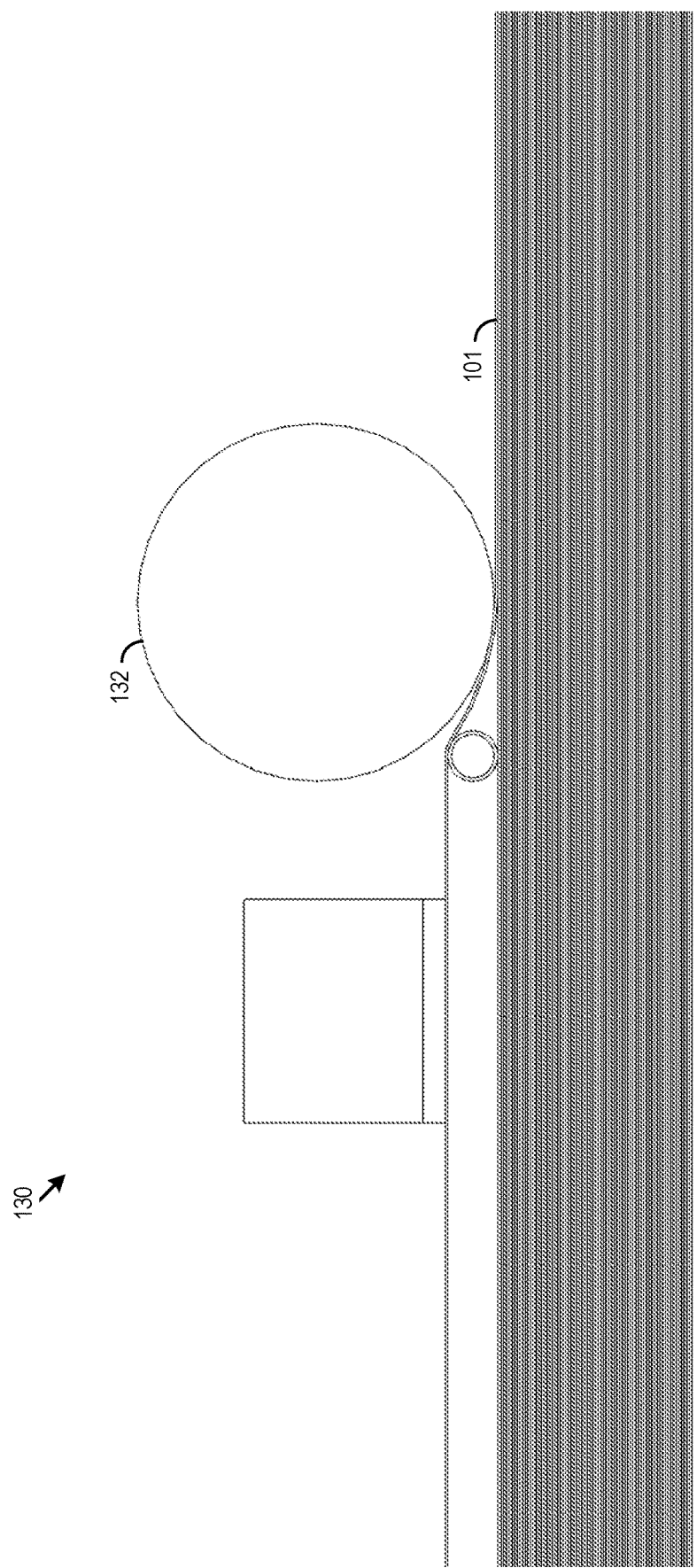
FIG. 6 shows yet another close up view of the top roller arm.

The example cleaning system 130 may include a two-arm system such as that described above. For additional illustration, FIGS. 4-6 are also referred to, which show a close-up view of the top roller arm 132. In some cases, the cleaning system may include ionized air pressure cleaning, washing systems (with a wash fluid such as an alcohol or other fluid), or other cleaning systems.

After the preform stack is assembled, the conveyor system 140 may receive commands sent by the logic 200 to convey the preform stack to the press 150 (204). The conveyor system may include a conveyor belt. Additionally or alternatively, the conveyor system 140 include a robotic arm or another pick-and-place system.

When the preform stack is inside the press 150, the logic 200 may send press commands to the stack to apply pressure (e.g., with a top and/or bottom press plate) to the preform stack (206). In some cases, the press commands may further include commands to apply heat (e.g., to heat the preform stack to a layer adhesion temperature). A layer adhesion temperature may include a temperature at which neighboring sheet adhere and/or fuse to one another. In some cases, the adhesion temperature may be selected to be just above a softening temperature (for the sheet materials), allowing neighboring sheets to deform and adhere. In some cases, the adhesion temperature may be above the melting temperature (for the sheet materials and/or a subset of the sheet materials) allowing neighboring sheets to adhere through melting (or partial melting) and re-solidification (e.g., freezing). In some implementations, the press commands may further include commands to evacuate the press chamber, such that the pressing may happen under vacuum (or heat and vacuum).

As mentioned above, co-extruded first-stage films can be directly extruded on the top of each other on a preform assembly platform.

Co-extruders can produce quality films with multiple layers each in tens of micrometers in thickness. The technique discussed herein uses the co-extrusion process to produce first-stage films and directly lay them over the top of each other to produce multi-layered preforms for thin-film filter drawing.

The co-extrusion apparatus can include multiple extrusion lines for producing multi-material first-stage films with one or more extruder feed lines for each of the materials. The multiple materials combine and then are pressed into a slit die designed to force the streams materials together into a steam with at least one layer of each material. Co-extrusion dies may route the multiple input materials into up to 12 different layers. In some implementations, the size of opening of each slit may be adjusted by moving the lips between the slits to adjust the relative flow of material, and therefore relative thicknesses.

In this configuration for assembling multilayer preforms, the slit adjustment may be motorized such that the slit openings and their relative sizes can be adjusted based on command from control circuitry. In some cases, the relative sizes may be includes a portion of a preform specification also including layer order and/or other characteristics.

In co-extrusion, once the multi-sublayer film exits the die, it may go through a number of rollers including cooling rollers to roll the film.

The extruded multi-sublayer film may be laid on top of a preform assembly platform or an incomplete preform that is under assembly.

In various systems, the preform assembly platform can move along one or more axes, for example one longitudinal horizontal and one vertical to support horizontal layer laying and vertical stacking. The vertical position can be adjusted such that the die exit is at a small distance from the top surface of the incomplete preform that is being assembled (or for the first layer, the assembly platform). For each layer that is added to the preform, the preform platform may be vertically shifted to maintain the same extrusion output—top layer distance for each additional layer. The die temperature may be adjusted such that the extruded material is hard enough at the exit that does not deform or change thickness, but still soft enough that adheres to the top surface of the preform under assembly. The preform assembly can be also in an enclosure that provides a warm background temperature to facilitate the adhesion. This enclosure can additionally or alternatively provide vacuum such that the layers tend to settle free of interlayer bubbles.

A roller may be fixed relative to the extrusion die output to place a (slight, e.g., sufficient to remove bubbles or other deformations in the softened material) vertical pressure on the film. A vacuum bar may (additionally or alternatively) be utilized to remove gasses and/or dust particles to assist in deformation and debris free layer adhesion. In some case, the distance from the top roller to the die output, the roller temperature, and the vertical pressure that the roller applies may be adjusted to minimize the deformation of the film as the film is adhered to the top of the preform.

As mentioned above, multilayer extrusion die allows for thickness adjustment of die slits and therefore the internal sublayers of the film. Extrusion speed may be used to adjust the thickness of the extruded sheet without changing the internal thickness ratios within the sheet. Therefore, as the preform is being assembled, the sheet thickness and/or the internal sublayer thickness ratios can be dynamically adjusted layer-to-layer.

Figure 7:
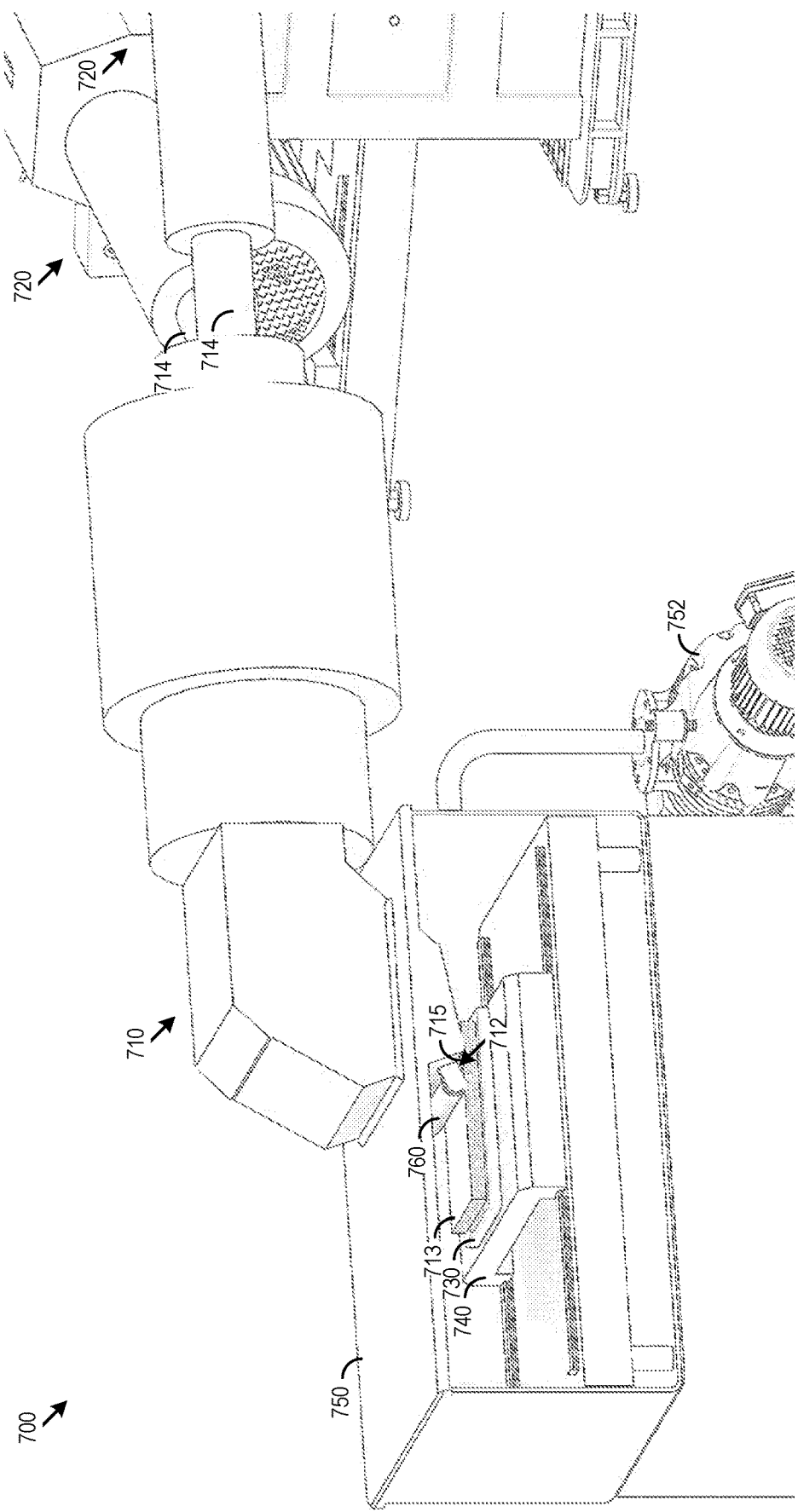
FIG. 7 shows an example device for extrusion.
Figure 8:
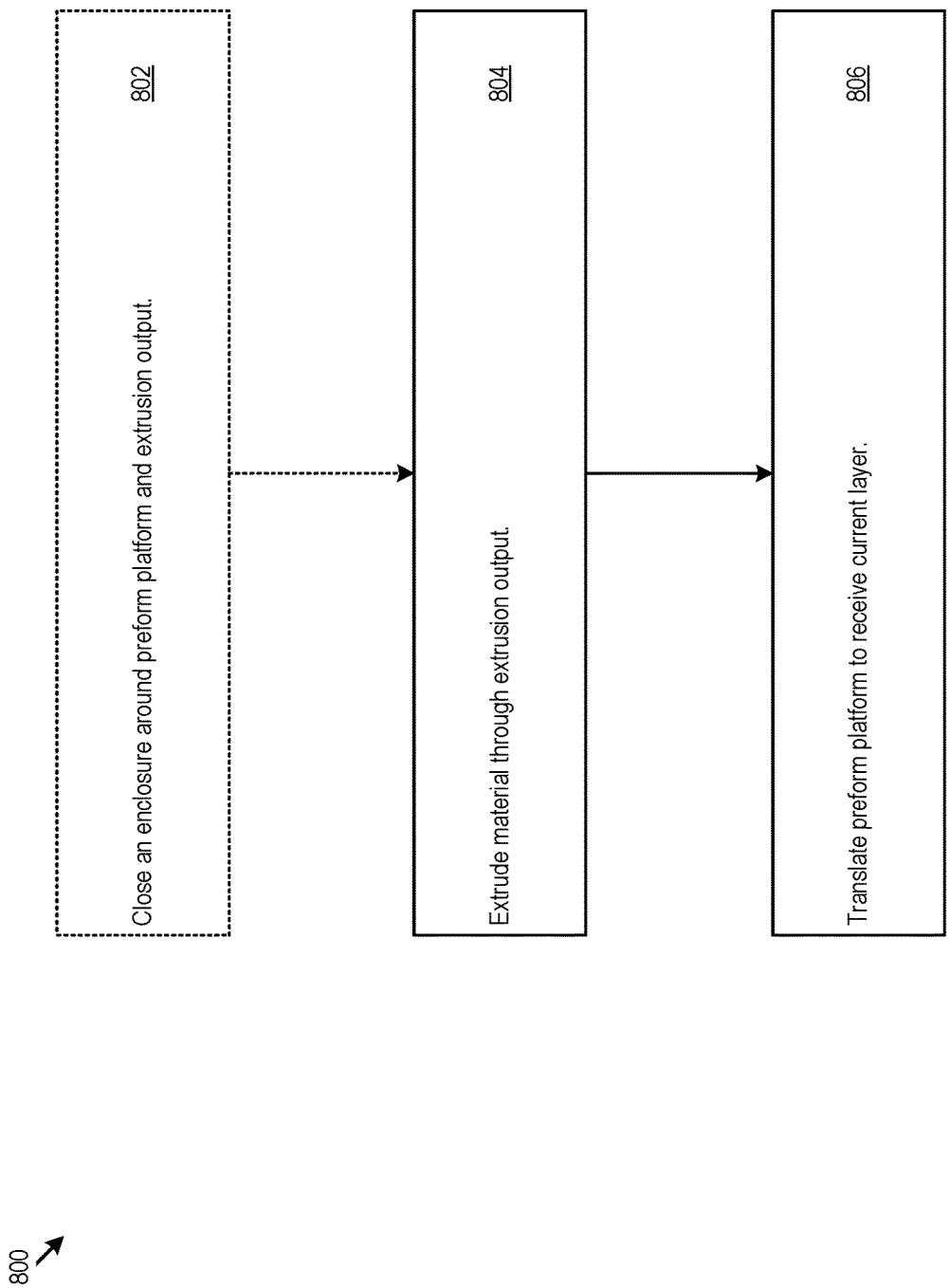
FIG. 8 shows an example technique for extrusion.
Figure 9:
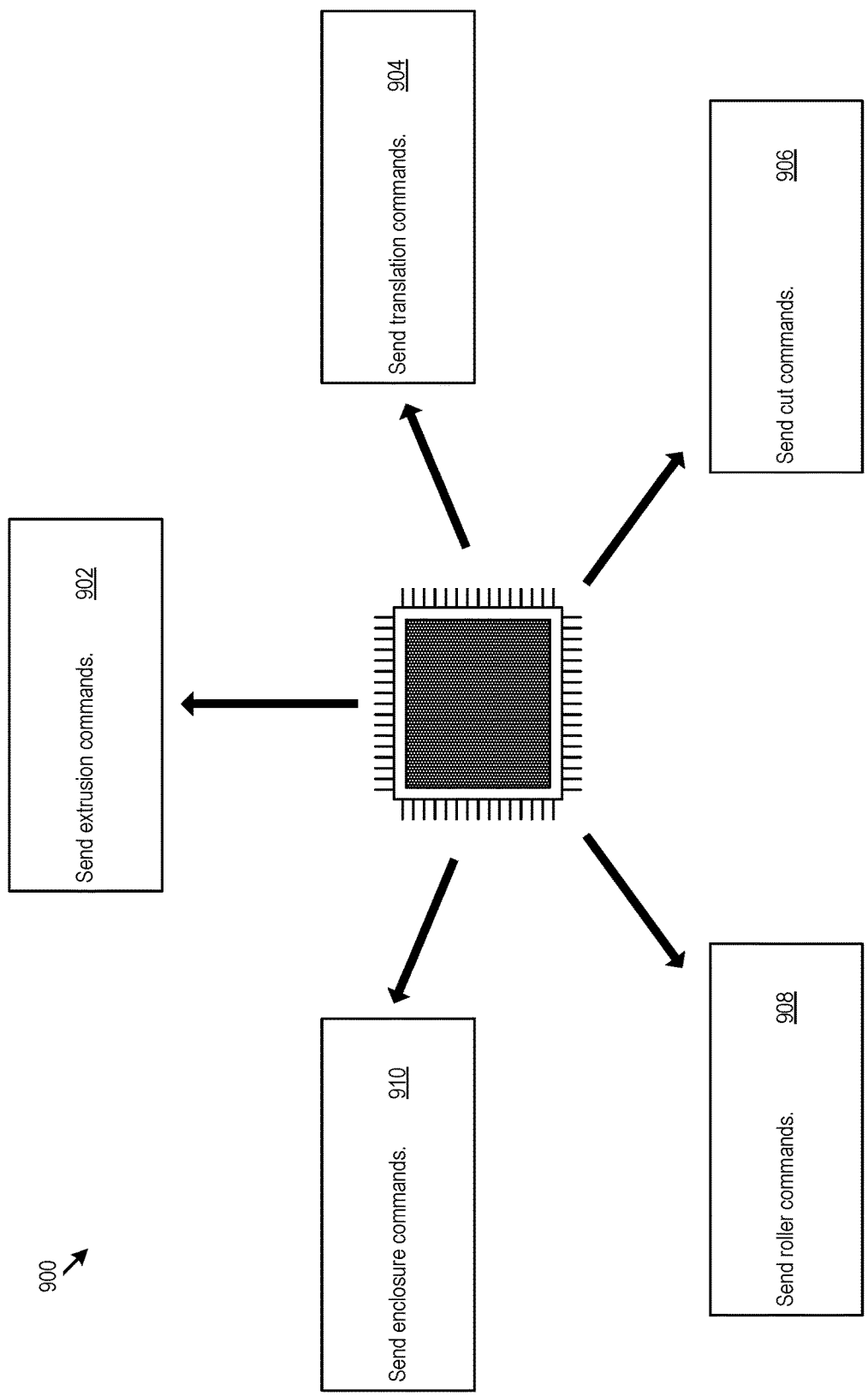
FIG. 9 shows example corresponding logic for operation of the example extrusion device of FIG. 7.

Referring now to FIG. 7, an example device 700 for extrusion is shown. The device includes an extrusion die 710 including an extrusion output 712 and extrusion inputs 714 connected to material feed lines 720. A roller 760 is mounted relative to the extrusion output 712. The device 700 further includes a preform assembly platform 730 and a translation stage 740. An enclosure 750 surrounds portions of the device 700 including the preform assembly platform 730 and the extrusion output 712. While continuing to refer to FIG. 7, the description below also refers to FIG. 8, which shows an example complementary technique 800 for extrusion-based preform fabrication, and FIG. 9, which shows example corresponding logic 900 for operation of the example extrusion device 700.

Figure 10:
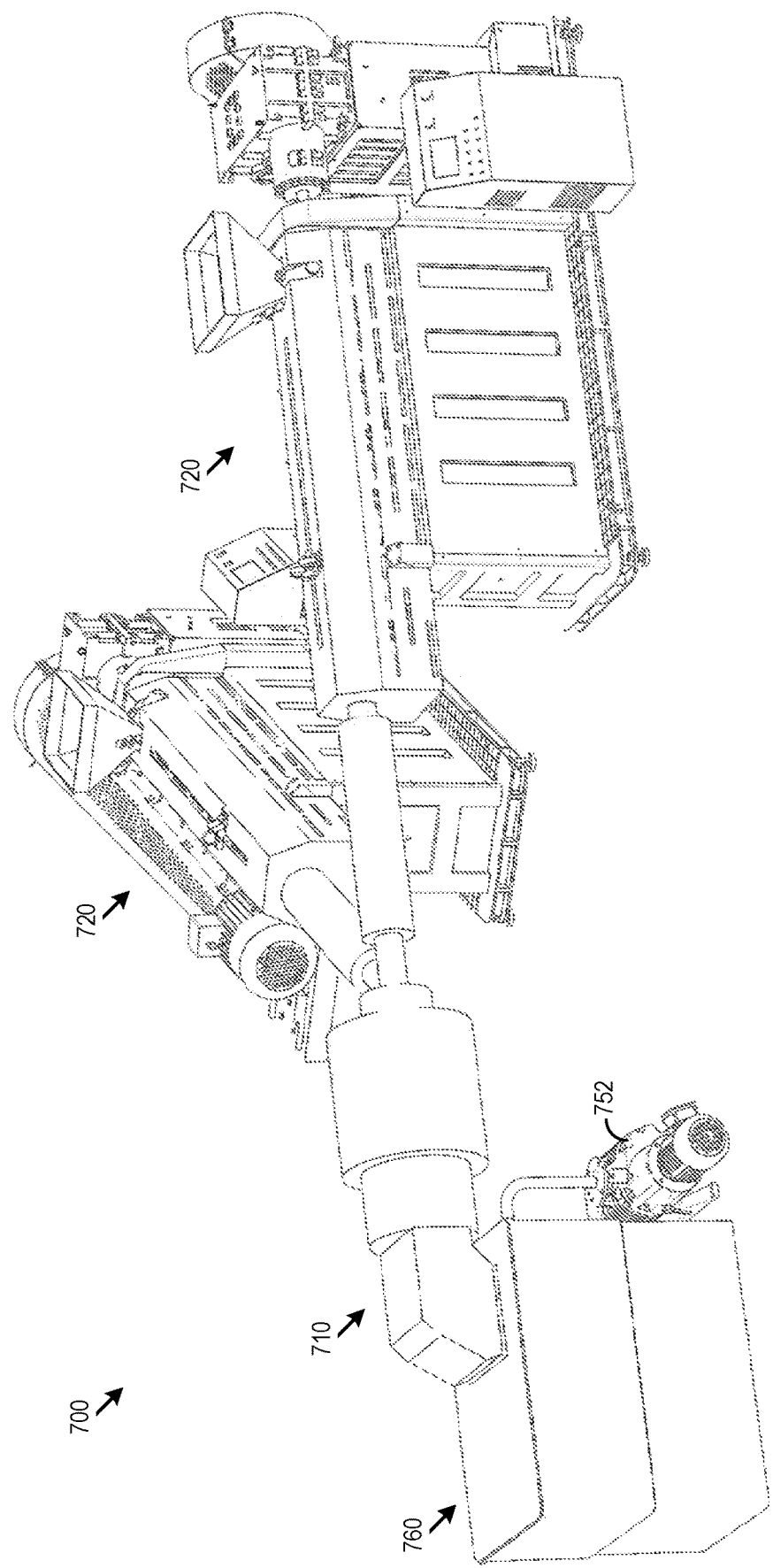
FIG. 10 shows another view of the device of FIG. 7.
Figure 11:
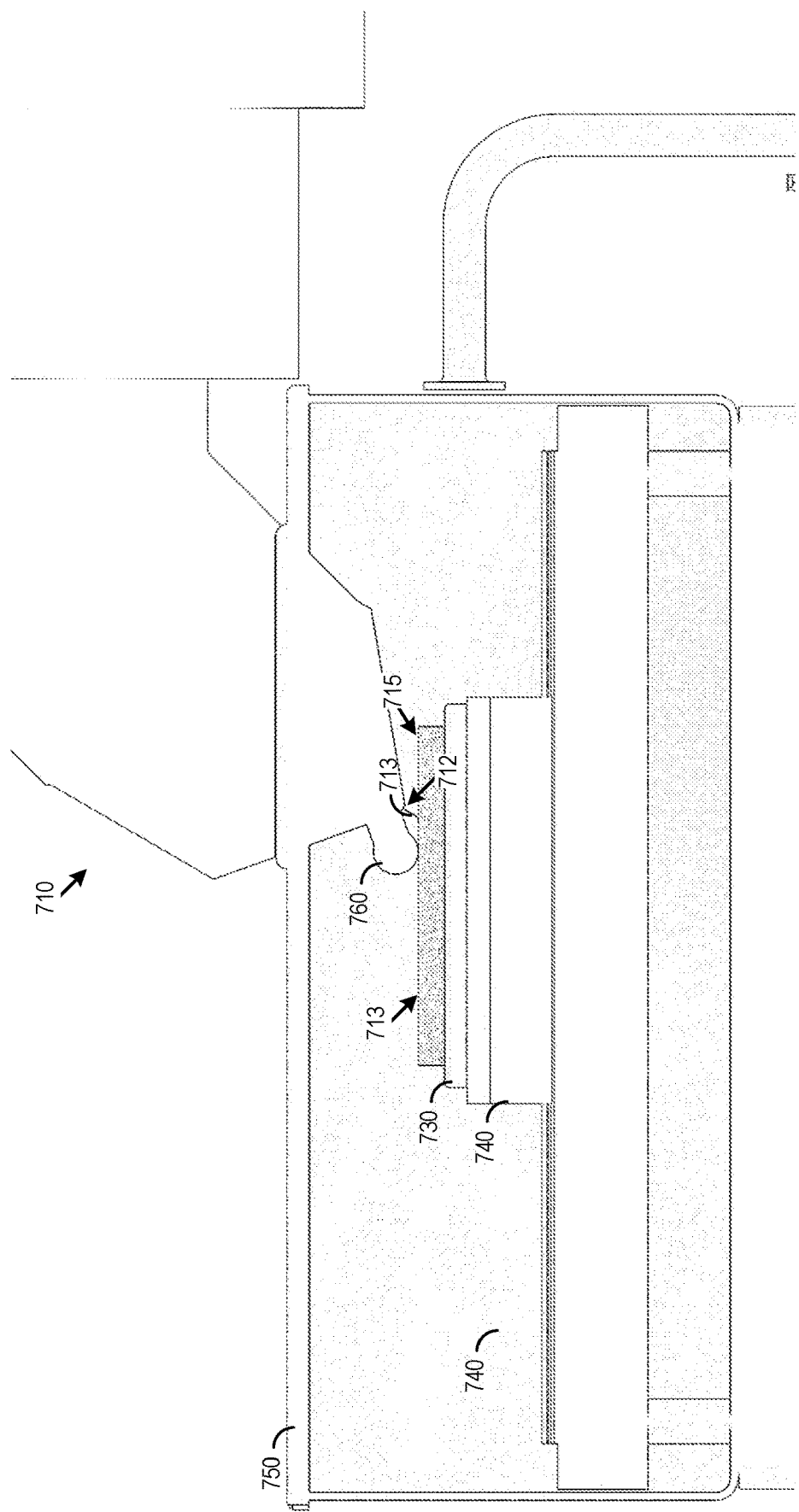
FIG. 11 shows yet another view of the device of FIG. 7.
Figure 12:
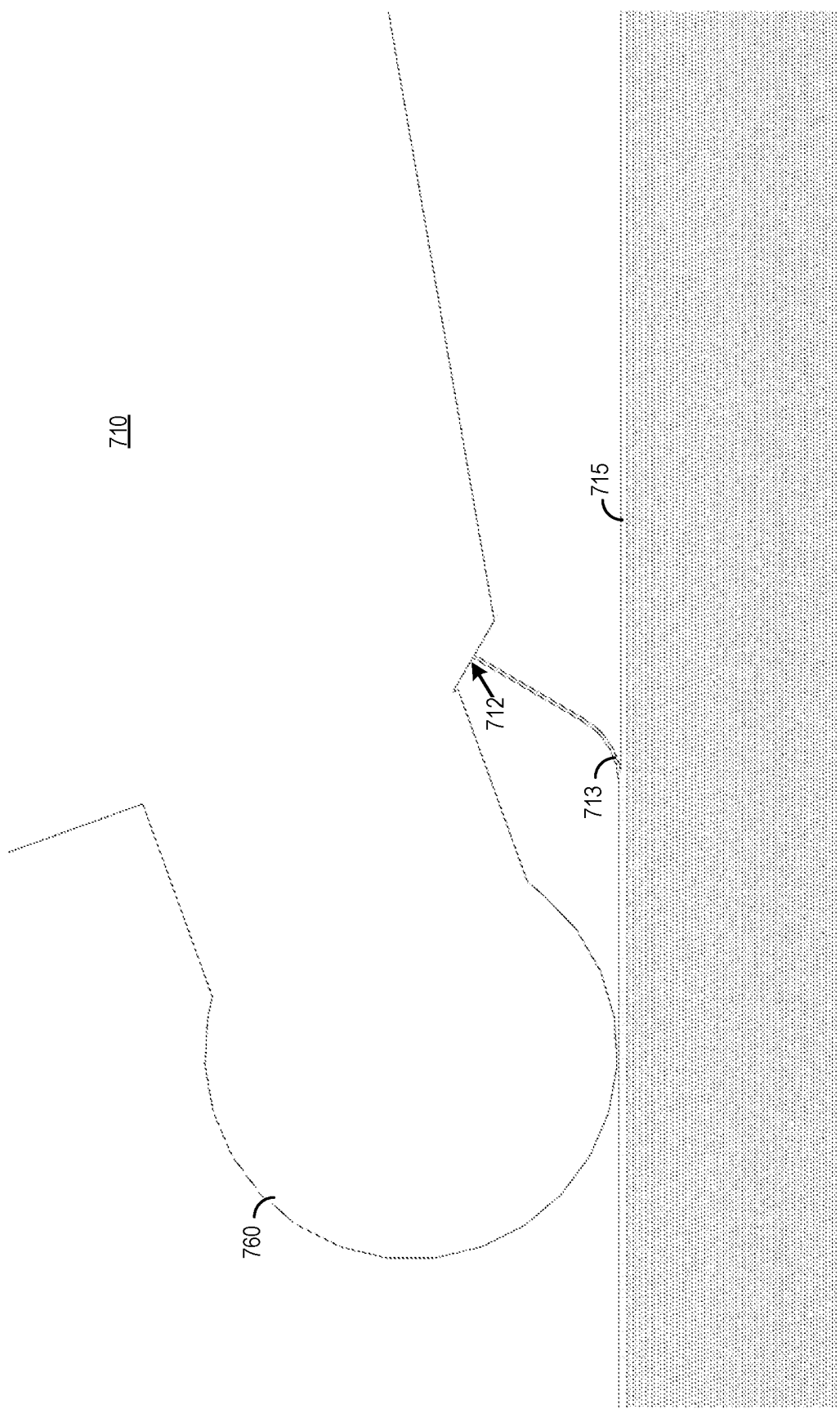
FIG. 12 shows yet another view of the device of FIG. 7.

For additional illustration, we also refer now to FIGS. 10-12, which show other views of the device 700.

The extrusion die 710 may extrude material through the extrusion output 712 to generate a film (804). In various implementations, the extrusion output 712 may be slit shaped. The material may be feed to the extrusion output 712 via extrusion inputs 714. In some cases, the extrusion inputs may be internal to the extrusion die 710. In some cases, multiple extrusion inputs (whether internal or external) may be connected to a single feed line or multiple feed lines providing the same material. In some cases, different inputs may be connected to different feed lines providing different materials. In some cases, an extrusion die may include up to 12 inputs to support 12 sublayers in the extruded film, where the film provides a layer of the fabricated preform. In some implementations, the logic 900 may send extrusion commands control the flow and/or rate of extrusion (902). In some cases, the extrusion commands may include commands to adjust parameters of the extrusion system such as apertures for controlling relative sublayer thicknesses. In various implementations, the extruded film may range from less than 10 microns to 1000 or more microns thick. In some cases, the extruded film may be 300-400 microns thick.

In various implementations, the material in the feed lines may include polymers such as liquid crystal polymer or other polymer materials; glasses; metals; or other materials for fabrication of optical filters and/or other optical devices.

To extrude the film, the extrusion die may force materials from the one or more extrusion inputs through channels to the extrusion output. In some cases, where there are multiple inputs, the channels may force the materials from the different streams into a single stream for the output. Accordingly, where the inputs have different materials, the combined stream may be made up of multiple materials.

In various implementations, the multiple materials may be ordered in patterns such as alternating patterns (with odd layers having the same material and even layers having a second material). Repeating patterns, mathematically advancing patterns or other patterns. In some cases, the layers may be in a selected order (e.g., by an operator) or random/pseudorandom order. In some two-material cases, a subset of sublayers may be selected to have a first material and a complement set (e.g., the remaining sublayers in the film that are not part of the subset) may be selected to have second material.

The translation stage 740 may position the preform assembly platform 730 such that the film is laid down on to the top of the preform stack forming a current layer 713 of the preform stack (806). The top of the preform stack is formed by previous layer 715. The current layer 713 is the layer currently being extruded (as the film) while previous layers 715 include layers previously extruded and laid on the preform stack. The translation stage moves preform stack such that the current layer covers the preform stack (e.g., from end-to-end). The logic 900 may send translation commands to the translation stage 740 to cause the movement of the translation stage described herein (904).

For example, the translation stage may travel horizontally (e.g., in one horizontal direction) from a layer start point to a layer endpoint.

When the layer endpoint is reached, the extrusion may cease/pause and to form an end of the current layer. In some cases, a cutter (e.g., on the extrusion die 710) may cut the current layer 713 to separate it from the extrusion output 712. The cutter may include edges or blades that may sever the film; cutting lasers, which may ablate, melt, and/or burn to cause the separation; a heater; or another cutting device to separate the film at the extrusion output from the current layer. The cutter may be controlled via cut commands (906).

After reaching layer endpoint and separating the film at the extrusion output from the current layer, the translation stage 740 may increment downward vertically (e.g., by the thickness of the current layer 713 just completed) and return to the layer start point. The example device 700 may then resume extrusion and deploy a new current layer.

In various implementations, the device 700 may include a roller 760 that, while the current layer 713 is being laid, may impart vertical downward pressure on the current layer to assist in removing deformations/bubbles and adhering the current layer 713 to the top previous layer 715. In some cases, the vertical distance between the bottom of the roller 760 and the extrusion output may be (manually and/or dynamically, e.g., by roller commands (908)) adjusted to control the level of pressure imparted. Additionally or alternatively, the horizontal distance may be similarly adjusted to control where relative to the extrusion output the vertical pressure is imparted. In some cases, the vertical/horizontal positioning may be selected to eliminate/minimize/reduce deformations or incomplete interlayer adherence. In some cases, the roller 760 may be heated to a layer adherence temperature to aid in interlayer adherence. In some cases, heating for interlayer adherence may be regulated by the extrusion die 710, e.g., such that upon exit at the extrusion output, the film is at the temperature used for interlayer adherence.

In various implementations, the extrusion output and preform platform may be closed within an enclosure 750 (802) or covered by a dust shield. In some cases, the enclosure 750 may be moisture-resistant, dust-resistant, and/or air tight. In some cases, the enclosure may be sealed to support low, moderate, and/or high vacuum. A vacuum pump 752 may be used to evacuate the enclosure. The enclosure 750 may (alternatively or additionally) include a heater to heat the enclosure to a layer adhesion temperature. The logic 900 may send enclosure commands to control the temperature and/or vacuum state within the enclosure (910).

The description above discusses optical materials, devices, and systems. "Optical" may refer to visible, infrared, ultraviolet, and x-ray radiation and further to terahertz radiation and other radiation bands used in imaging, sensing, or other optics applications.

The methods, techniques, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations are described herein. Other implementations are possible. Various examples are expressly discussed below.

E1. In an example, a device includes: an extrusion die including an extrusion output, the extrusion output slit-shaped to produce a film; a preform assembly platform; a translation stage, where motion by the translation stage causes relative motion between the extrusion output and the preform assembly platform; controller circuitry communicatively coupled to the translation stage, the controller circuitry configured to send motion commands to the translation stage to position the preform assembly platform such that current film generated by extrusion die is layered on top of previous film generated by the extrusion die to create a preform stack.

E2. The device of example E1, where the extrusion die further includes multiple extrusion inputs coupled to the extrusion output, where: optionally, the extrusion die includes up to 12 inputs.

E3. The device of example E2 or any other of the preceding examples where the extrusion die output is coupled to the multiple extrusion inputs by channels that force materials from the multiple extrusion inputs into a single stream for the extrusion output to produce a multi-sublayer film at the extrusion output.

E4. The device of example E2, E3, or any other of the preceding examples where a subset of the multiple extrusion inputs are each coupled to a single material feed line to produce multiple same-material sublayers within the film.

E5. The device of example E4 or any other of the preceding examples where the subset includes odd-film-sublayer extrusion inputs.

E6. The device of example E4, E5, or any other of the preceding examples where a complement set of extrusion inputs are each coupled to another single material feed line, the complement set including the complement set of the subset, where: optionally, the complement set incudes even-film-sublayer extrusion inputs.

E7. The device of any of the preceding examples, further including: a roller fixed in a position relative to the extrusion output, the position selected such that the roller imparts vertical pressure on the film after the film exits the output.

E8. The device of any of the preceding examples further including a cutter fixed in a position relative to the extrusion output, the cutter communicatively coupled to the controller circuitry where, optionally, the controller circuitry is further configured to: determine that the translation stage has reached a layer-end travel point for the preform stack; at the time the translation stage is at the layer-end travel point, send a cut command to cause the cutter to apply a cutting action to the film; optionally, determine a layer-begin point for translation stage; and optionally, after execution of the cut command, send a motion command to cause the translation stage to move to the layer-begin point.

E9. The device of example E8 or any of the other preceding examples where the cutter includes an edge cutter, a laser cutter, and/or a heater.

E10. The device of any of the preceding examples further including a dust-resistant shield disposed around the preform assembly platform and the extrusion output.

E11. The device of any of the preceding examples further including an enclosure around the preform assembly platform and the extrusion output, where: optionally, the enclosure is dust-resistant and/or moisture resistant; optionally, the enclosure includes a heater communicatively coupled to the controller circuitry, the controller circuitry configured to send enclosure commands to cause the heater to hold the enclosure temperature at a layer-adhesion temperature for the preform stack; optionally, the enclosure includes a vacuum-sealed-enclosure held at least at low vacuum.

E12. The device of any of the preceding examples where the extrusion output is between 10 microns and 1,000 microns thick.

E13. The device of any of the preceding examples where the preform stack includes an optical filter preform stack.

E14. The device of any of the preceding examples where the extrusion die includes an extrusion die for polymer materials, glass materials, or both.

E15. In an example, a device includes: a sheet reservoir; a preform assembly platform; an assembly robotic arm including a sheet grip disposed on the distal end of the robotic arm; a press including a heated press-plate; and a conveyor; controller circuitry communicatively coupled to the robotic arm, the conveyor and the press, the controller circuitry configured to: send pick-and-place commands to the robotic arm to select sheets from the sheet reservoir and build a vertical stack of sheets on the preform assembly platform; after the sending the pick-and-place commands, send conveyance commands to the conveyor to translate the preform assembly to the preform assembly platform to the press; and after the sending the conveyance commands, send press commands to the press to apply heat and pressure to the vertical stack of sheets.

E16. The device of example E15, where the sheet reservoir includes: multiple bins with each with a different type of sheet, where optionally the bins are ordered in an array; a bin with sheets stacked in a stacking order; a conveyor belt loaded with sheets in a stacking order; a carousel with multiple carriages of sheets; multiple tracks each with a different type of sheet; or any combination thereof.

E17. The device of either example E15 or E16, where the preform assemble platform includes a tray for holding the vertical stack of sheets.

E18. The device of any of examples E15-E17, where the sheet grip includes: a clamp, a suction cup, or both.

E19. The device of any of examples E15-E17, where the pick-and-place commands include commands to stack sheets in a repeating pattern.

E20. The device of example E19 or any of examples E15-E18, where the repeating pattern include an alternating pattern of two types of sheets.

E21. The device of any of examples E15-E20 where, the robotic arm includes a plane, where: optionally, the pick-and-place commands include commands to apply horizontal pressure using the plane to straighten the stack of sheets.

E22. The device of any of examples E15-E21 where the preform assembly platform includes a sheet alignment sleeve, where: optionally, the sheet alignment sleeve is removable; and optionally, the conveyance commands, pick-and-place commands, or both include commands to remove the sheet alignment sleeve after sheet stacking is complete.

E23. The device of any of examples E15-E22, where: the press includes: a top-press plate; a bottom press plate; a vacuum chamber; or any combination thereof; and optionally, the press commands include commands to sandwich press the vertical stack under vacuum, heat, or both.

E24. The device of any of examples E15-E23, where the press commands include commands to cause the heated press plate to heat to a layer-adhesion temperature for the vertical stack of sheets, where: optionally, the layer-adhesion temperature is selected based on the material makeup of the vertical stack of sheets.

E25. The device of any of examples E15-E24, where the conveyor includes a conveyor belt, a robotic arm, or both.

E26. The device of any of examples E15-E25, further including a first roller arm, where: optionally, the controller circuitry is configured to send roller commands to cause the first roller arm to roll horizontally across the vertical stack of sheets after a sheet is placed in accord with the pick and place commands; optionally, the device includes a second roller arm; and optionally, the roller commands further include commands to cause the second roller arm to roll in parallel with the first roller arm on the opposite side of the vertical stack of sheets.

E27. The device of any of examples E15-E26, further including a cleaning station, where: optionally, the pick-and-place commands include commands to cause the robotic arm to place the sheets in the cleaning station for cleaning prior to placement on the vertical stack of sheets; and optionally, the cleaning station includes a dust-pickup roll, an ionized air gun, or both.

E28. In an example, a method includes: extruding a film through an extrusion die to an extrusion output; coordinated with the extrusion, translating a preform assembly platform relative to the extrusion out, such that the film falls onto a preform stack on the preform assembly platform, the film forming current layer of the preform stack on top of a previous layer of the preform stack, the previous layer also extruded through the extrusion die.

E29. The method of example E28, further including feeding the extrusion die via multiple extrusion inputs, where: optionally feeding the extrusion die includes feeding the extrusion die through up to 12 inputs.

E30. The method of example E29 or E28 where feeding the extrusion die includes feeding the extrusion die via channels that force materials from the multiple extrusion inputs into a single stream for the extrusion output to produce a multi-sublayer film at the extrusion output.

E31. The method of example E29, E30, or E28 where feeding the extrusion die includes feeding a subset of the multiple extrusion inputs from a single material feed line to produce multiple same-material sublayers within the film.

E32. The method of example E31 or any of examples E28-E30 where the subset includes odd-film-sublayer extrusion inputs.

E33. The method of example E31, E32, or any of examples E28-E30 where feeding the extrusion die includes feeding a complement set of extrusion inputs from another single material feed line, the complement set including the complement set of the subset, where: optionally, the complement set incudes even-film-sublayer extrusion inputs.

E34. The method of any of examples E28-E33, further including applying a roller on top of the current layer to impart vertical pressure on preform stack.

E35. The method of any of examples E28-E34, further including cutting the current layer after covering the previous layer, where: optionally, the method further includes: determining that the previous layer has been covered responsive to the preform assembly platform reaching a layer-end travel point; at the time the translation stage is at the layer-end travel point, causing a cutter to perform the cutting; optionally, determining a layer-begin point for the preform assembly platform; and optionally, after the cutting, causing the preform assembly platform to move to the layer-begin point.

E36. The method of example E35 or any of examples E28-E34, where the cutter includes an edge cutter, a laser cutter, and/or a heater.

E37. The method of any of examples E28-E36 further including shielding the preform stack from dust while on the perform assembly stack.

E38. The method of any of examples E28-E37, further including closing an enclosure around the preform stack during preform generation, where: optionally, the enclosure includes a dust resistant and/or moisture resistant enclosure; optionally, the enclosure includes a vacuum-sealed-enclosure held at least at low vacuum.

E39. The method of any of examples E28-E38, further including heating the preform assembly platform to a layer-adhesion temperature.

E40. The method of any of examples E28-E39, where extruding the film includes extruding a film between 10 microns and 1,000 microns thick.

E41. The method of any of examples E28-E40, where the preform stack includes an optical filter preform stack.

E42. The method of any of examples E28-E41, where extruding the film includes extruding polymer materials, glass materials, or both.

E43. A method including implementing any of the devices of any of examples E1-E27.

E44. A method of manufacturing including implementing any of the devices and/or methods of the preceding examples to fabricate a preform, where: optionally, the preform is an optical filter preform.

Headings and/or subheadings used herein or in the above referenced provisional applications are intended only to aid the reader with understanding described implementations.

What is claimed is:

1. A method of extruding a film comprising a preform stack, the preform stack including a plurality of layers including a current layer and a previous layer, the method comprising:
    extruding the current layer through an extrusion die to an extrusion output; and coordinated with the extrusion,
    translating a preform assembly platform relative to the extrusion output, such that the current layer falls onto a previous layer of the preform stack provided on the preform assembly platform, the previous layer also extruded through the extrusion die, and
    pressing the extruding current layer on to the previous layer with a roller fixed in a position relative to the extrusion output, wherein the pressing occurs as the preform assembly platform translates its position.

2. The method of claim 1, further comprising feeding the extrusion die via multiple extrusion inputs, and
    feeding the extrusion die includes feeding the extrusion die through up to 12 inputs.

3. The method of claim 2 wherein feeding the extrusion die includes feeding the extrusion die via channels that force materials from the multiple extrusion inputs into a single stream for the extrusion output to produce a multi-sublayer film at the extrusion output.

4. The method of claim 1 further comprising cutting the current layer after the current layer covers the previous layer as determined by the preform assembly platform reaching a layer-end travel point.

5. The method of claim 4, further comprising translating the preform to a layer-begin point after reaching the layer-end point.

6. The method of claim 4 wherein the cutter includes an edge cutter, laser cutter, or heater.

7. The method of claim 1 wherein the extrusion output, roller, and preform assembly are all provided in an enclosure.

8. The method of claim 7 wherein the enclosure is dust and moisture resistant from the environment outside the enclosure.

9. The method of claim 8 wherein the enclosure is vacuum sealed.

10. The method of claim 9 further comprising heating the roller to hold the enclosure temperature at a layer-adhesion temperature.

11. The method of claim 1 wherein the film is an optical film between 10 to 1000 microns thick.

12. The method of claim 1 further comprising changing the thickness of the current layer as compared to the previous layer by adjusting the extrusion speed used for the current layer as compared to the extrusion speed used for the previous layer.

13. The method of claim 1 further comprising adjusting the vertical distance between the extrusion output and a bottom of the roller.

14. The method of claim 11, wherein each layer is composed of a nonporous material.

15. A method of extruding a film comprising a preform stack, the preform stack including a plurality of layers including a current layer and a previous layer, the method comprising:
    extruding the current layer through an extrusion die to an extrusion output; and
    coordinated with the extrusion,
        translating a preform assembly platform from a layer start point to a layer endpoint such that the current layer extrudes between the layer start point to the layer end point over a previous layer of the preform stack provided on the preform assembly platform, the previous layer also extruded through the extrusion die,
    pressing the extruding current layer on to the previous layer with a roller fixed in a position relative to the extrusion output, wherein the pressing occurs as the preform assembly platform translates its position, and
    cutting the current layer with a cutter after the current layer covers the previous layer as determined by the preform assembly platform reaching the layer endpoint,
    wherein the extrusion output, preform assembly, roller, and cutter are all provided in an enclosure, and the roller is heated to hold the temperature of the enclosure at a layer-adhesion temperature, and
    wherein the film is an optical film composed of a liquid crystal polymer, glass, or metal.

* * * * *